United States Patent [19]
Blanquet et al.

[11] Patent Number: 6,068,426
[45] Date of Patent: May 30, 2000

[54] METHOD OF CONNECTING CONDUITS

[75] Inventors: François Blanquet, Cormeilles-en-Parisis; Jean-Pierre Brazzini, Blanc Mesnil; Patrick Le Cointe, Bouffemont, all of France

[73] Assignee: Gaz de France (G.D.F.) Service National, France

[21] Appl. No.: 08/921,150

[22] Filed: Aug. 29, 1997

[30] Foreign Application Priority Data

Sep. 9, 1996 [FR] France .................................. 96 10977

[51] Int. Cl.⁷ .............................. E02F 5/10; B63B 35/03; E21B 19/00
[52] U.S. Cl. .............................. 405/184; 405/154; 175/52
[58] Field of Search ................................. 175/52, 53, 62, 175/45; 405/154, 156, 184

[56] References Cited

U.S. PATENT DOCUMENTS

| | | | |
|---|---|---|---|
| 2,839,271 | 6/1958 | Kandle | 175/53 |
| 3,525,405 | 8/1970 | Coyne et al. | 175/45 |
| 3,529,682 | 9/1970 | Coyne et al. | 175/45 |
| 4,143,721 | 3/1979 | Zuvela et al. | 175/45 |
| 4,456,078 | 6/1984 | Adam | 175/20 |
| 4,542,796 | 9/1985 | Delbarre | 175/19 |
| 4,796,669 | 1/1989 | St. Onge | 405/184 |
| 5,014,795 | 5/1991 | Gibson | 175/45 |
| 5,048,793 | 9/1991 | Mefford et al. | 405/184 |
| 5,163,520 | 11/1992 | Gibson et al. | 175/19 |
| 5,165,490 | 11/1992 | Nosaka | 175/45 |
| 5,182,516 | 1/1993 | Ward et al. | 324/326 |
| 5,361,854 | 11/1994 | Tull et al. | 175/45 |
| 5,427,475 | 6/1995 | Coss | 405/184 |
| 5,513,710 | 5/1996 | Kuckes | 175/45 |
| 5,526,886 | 6/1996 | Jenne | 175/45 |
| 5,553,680 | 9/1996 | Hathaway | 175/78 |
| 5,584,351 | 12/1996 | Ellicott | 175/62 |
| 5,749,678 | 5/1998 | Dose et al. | 405/184 |

FOREIGN PATENT DOCUMENTS

| | | |
|---|---|---|
| 0205696 | 12/1986 | European Pat. Off. . |
| 0235917 | 9/1987 | European Pat. Off. . |
| 0762039 | 3/1997 | European Pat. Off. . |
| 0762040 | 3/1997 | European Pat. Off. . |
| 0762042 | 3/1997 | European Pat. Off. . |

*Primary Examiner*—Thomas B. Will
*Assistant Examiner*—Gary S. Hartmann
*Attorney, Agent, or Firm*—Rothwell, Figg, Ernst & Kurz, P.C.

[57] ABSTRACT

The method concerned is for connecting a section of buried main conduit (120) to a secondary conduit. For this purpose, a starting pit (200) and a finishing pit (204) are dug, a drilling device comprising a series of rods to be placed end to end is lowered into one pit in a manner such as to drill along a horizontal axis at the level of or at a height close to that of the main conduit. Upon completion of the drilling, the secondary conduit is passed through the bore-hole (202) in a manner such that an end portion is situated above the pit, this portion is fixed to a first region of a branch connector for connecting the two conduits and this end portion, equipped with its connecter, is lowered into the pit and the connector is fixed to the main conduit.

6 Claims, 8 Drawing Sheets

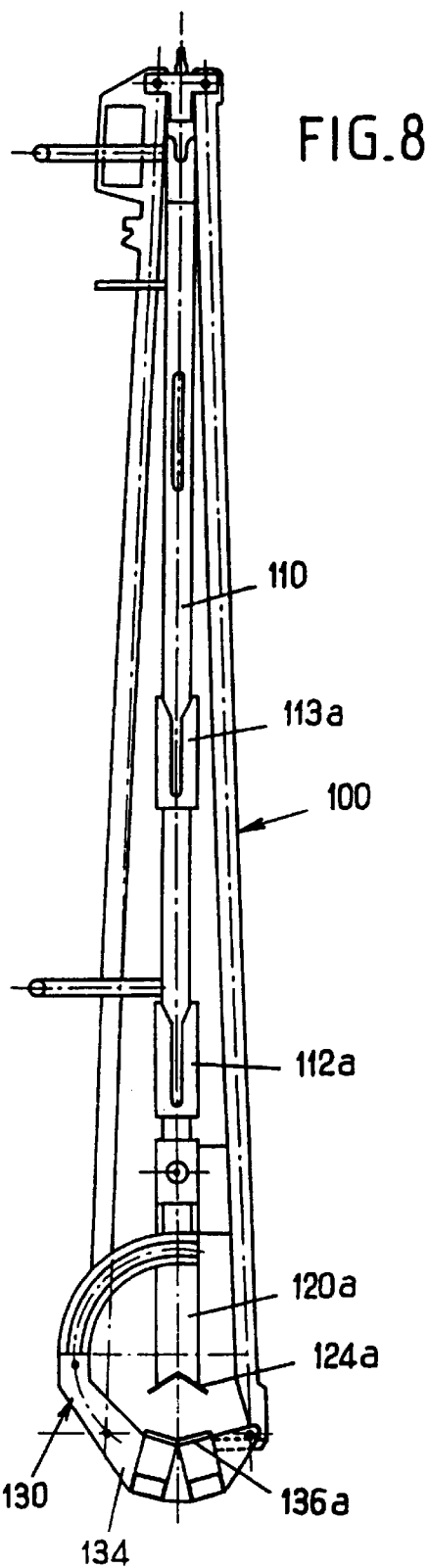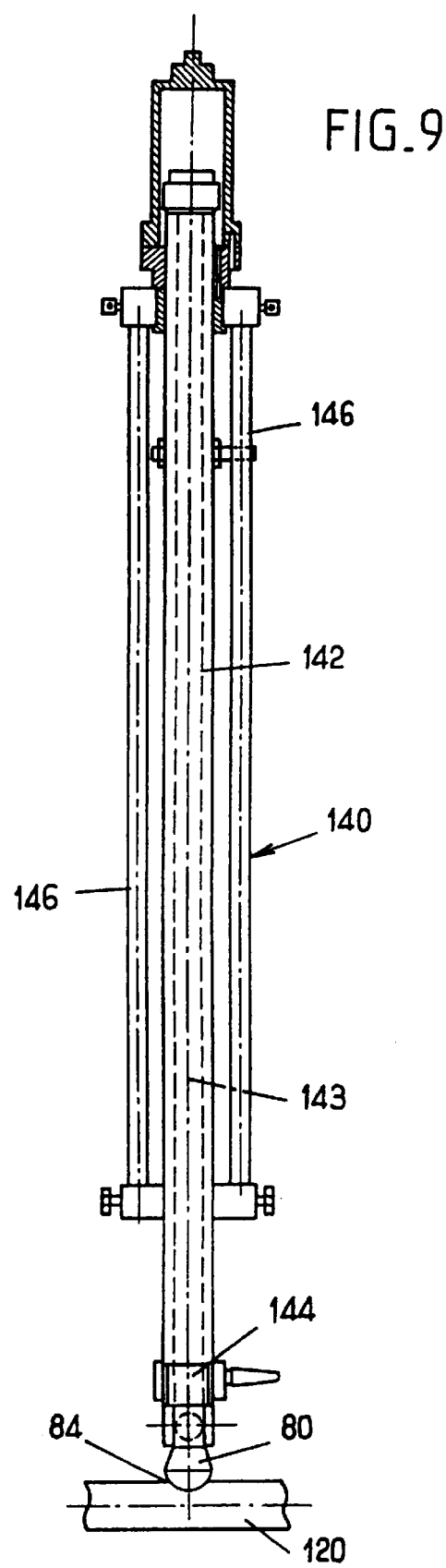

METHOD OF CONNECTING CONDUITS

BACKGROUND OF THE INVENTION

The invention relates to a method of laying conduits in the ground without the need to excavate the ground significantly.

Typically, the invention is applied to the connection of a buried section of main conduit (such as a pressurized fuel-gas conduit) to a secondary distribution conduit, for example, to a building.

Every residential or office building has a large number of underground conduits which supply and take away, for example, water, gas, electrical current, etc.

In the past, particularly in order to lay conduits of this type in the ground, trenches were excavated, the conduits were laid therein, and the trenches were then filled in again.

This is expensive, dangerous and impractical.

For this reason, it is already known to lay conduits such as pipes without the need to excavate trenches for the entire length of the conduit.

Thus, a drilling machine has already been used for driving a train of rods constituted by a large number of drilling bars or rods disposed end to end (for example screwed) and each several meters long into the ground, from the surface, along an oblique path. In this case, the direction of penetration (that is, of the drilling head which is disposed at the front end of the train of rods) can be regulated quite well so that the drilling first takes place obliquely downwards until the required depth is reached and then continues in a substantially horizontal direction.

After the drilling has been carried out and before the train of rods is removed, the conduit to be inserted (for example, a slightly flexible steel or plastic pipe) is fixed to the front end of the train of rods with the aid of a special device and the conduit to be laid is inserted in the drilling hole already in place with the aid of this device, and by progressive rearward movement (extraction) of the train of rods.

This method is used in particular for laying conduits over very long sections, for example, of 100 meters or more, and the drilling device used for this purpose which, amongst other things, has to have a tripod directed obliquely downwards in order to guide the train of rods, is large and weighs at least two tons because the weight of the drilling machine serves partially as an abutment for the force serving to push the train of rods forwards.

It is precisely when connecting to buildings, however, that a particular problem is encountered because, in this case, the section of main supply conduit, which usually extends under a road, has to serve, by means of the secondary branch conduit, a building disposed close to the road.

For this reason, it is still customary to lay these branch conduits for buildings in conventional manner by the excavation of a trench.

Now, it has already been indicated that this technique has disadvantages requiring in particular, heavy earth-moving and subsequent reinstatement works.

It would therefore be desirable to have available for these and similar applications, a solution which requires only an extremely small hole in the ground surface and not a trench generally over the greater part of the connection conduit to be laid.

The currently-known drilling methods in which a train of rods is driven underground obliquely are in fact not suitable for forming branch conduits for buildings.

With this method, it is certainly possible to guide the drilling quite precisely. However, it is not possible to work as close as would be desirable to the main conduit to be connected without at the same time risking damage to this conduit during drilling.

Moreover, the borehole has to be positioned underground at a point having a relatively large lateral offset relative to the main section. The drilling machine would therefore be installed on the opposite side of the road which would involve closing the whole of one side of the road or, since the resulting lateral distance would, as a general rule, not be sufficient, it would also be necessary to close off the land opposite the building to be connected. The resulting demolition and reinstatement works alone are conducive to the exclusion of this technique.

SUMMARY OF THE INVENTION

In order to provide a satisfactory solution to the problems posed, the invention therefore proposes, as a solution for avoiding the excavation of a trench of a length comparable to that of the secondary conduit to be connected:

digging a starting pit and a finishing pit, one of these pits being dug out until the immediate surroundings of the main conduit are cleared, the other being at least substantially of the same depth, providing a drilling device comprising a series of drilling-rod elements to be arranged end to end along an axis in order to constitute a train of drilling rods suitable for being pushed forwards in the ground by a drilling drive mechanism, lowering the said device and the drilling-rod elements into one of the said pits which has a horizontal section smaller than that necessary for a person to be able to operate the said device and the train of drilling rods therein, the said rod-elements being selected in a manner such that, individually, they have an axial length shorter than the distance separating the wall of the pit in which the hole is to be drilled from the opposite wall, the axis of the drilling train is positioned in this pit in order to drill substantially horizontally, practically at the level of or at a height very close to that of the main conduit, transversely relative thereto, after drilling substantially along this axis until the two pits are connected, the secondary conduit is passed through the bore-hole in a manner such that an end portion thereof is situated above the pit in which the main section is disposed, a first portion (or region) of a branch connector for connecting the two conduits is fixed there, to this end portion, the said end portion equipped with its connector is lowered into the pit, a second portion of the said connector is fixed to the main conduit therein, and the pits are closed up.

In particular, the invention thus enables substantially horizontal bore-holes to be formed and conduits to be laid therein, causing as little destruction of their surroundings as possible, in particular with only two relatively small openings formed in the surface of the ground.

Typically, the starting pit (as well as the finishing pit) will have a substantially uniform cross-section throughout its height, that is a horizontal section of about 70 cm×40 cm by a depth of 1 m to 1.5 m.

It should be noted that the positioning of a vertical starting pit in the region of the main section to be connected simultaneously solves two problems.

In the first place, a free space is created there for the assembly to be formed <<by hand>> between the main section and the branch conduit (preferably operating from the top of the pit by means of a remote operating device), after the branch conduit for the building has been laid. The starting pit is dug out in a conventional manner with the aid of a mechanical shovel or is sunk vertically by a special method, by an erosion technique which is reasonable since the starting pit preferably has to extend approximately as far as just below the main section to the connected.

The second problem to be solved lies in the immediate proximity of the line of the main section to be connected and of the secondary conduit, transverse one another, that is, an arrangement of these conduits immediately above or below one another, so that they can subsequently be connected easily and without longitudinal clearing (with the aid of a T-piece or another adapter, particularly if gas or water pipes are involved).

When the drilling commences from an open starting pit through which the main section extends, the bore-hole may start directly, that is, only a few millimeters, above or below the main section with transverse propping.

Working from a starting pit of this type also enables an essentially straight assembly line to be formed between the point of connection to the main section and the end point of the branch connection to the building. Moreover, excavation can begin in this direction, generally a horizontal direction, so that little action on the direction is necessary during drilling. This method of operation allows a relatively rigid train of rods to be used, with short rod elements (typically 10 cm to 35 cm) which are compatible with the horizontal, and possibly smallest, dimension of the pit (typically of the order of 40 cm).

It will also be noted that it is not sensible, in the case of works starting from a starting pit of this type, to advance the bore-hole by erosion with the aid of water injected into the ground under high pressure from the drilling head. There would in fact be a risk of this water accumulating behind the train of rods, that is, in the starting pit.

By virtue of the use of a very firm train of rods, particularly by means of rods made of a solid material or at least tubes having a very large wall thickness, it is possible to carry out the drilling essentially (or exclusively) by advancing the train of rods by pressure. This method of operation is particularly suitable for works carried out from a pit since the drive mechanism for advancing the train of rods by pressure can then bear against one wall of the pit.

In this case, rotation of the train of rods in order to scrape or "grind" the ground material in front of the drilling head is advantageous only in certain cases. It is necessary, however, to be able to rotate the train of rods through an angle less then 360° because the direction of advance of the drilling can be acted on by means of an asymmetric chamfer on the tip of the train of rods and of its angular position relative to the drilling axis.

In order to put the drilling rod in place along the drilling axis, which is essentially horizontal, it will also be possible to introduce new rods to be inserted into the starting pit from a feed magazine, or to remove rods to be removed from this horizontal position. The difficulties, for example, jamming, etc., connected with a change in the direction of the rods during their supply will thus be almost completely prevented.

The drilling drive mechanism itself which, as already stated above, provides essentially or exclusively a forward push along the drilling axis, can be translated longitudinally in one direction and in the other in the starting pit, parallel to the drilling axis and at least over the length of an individual rod. The drilling drive mechanism preferably moves in one direction and the other between an advanced position directly at the beginning of the drill hole in the starting pit and a retracted position in the region of a rod loader/extractor device which itself is then disposed against the opposite wall.

The starting pit is preferably formed in a manner such that the main section to be connected is disposed below the rod loader/extractor, whereas the drilling drive mechanism, which requires considerably more space, is disposed substantially at the level of this main section, its casing possibly extending below the said section.

Concerning the further steps subsequent to the drilling, the reader is invited to refer to the texts of patent applications FR-A-2 738 617, FR-A-2 738 614 and FR-A-2 738 615 which also relate to the connection of conduits and the contents of which are incorporated in the present description by reference.

BRIEF DESCRIPTION OF THE DRAWINGS

A more detailed description of the invention will now be provided with reference to the appended drawings, in which:

FIGS. 8 and 9 show, in a general view, two devices usable for the positioning and the connection of the conduits.

DETAILED DESCRIPTION OF THE PREFERRED EMBODIMENTS

Figure 1:
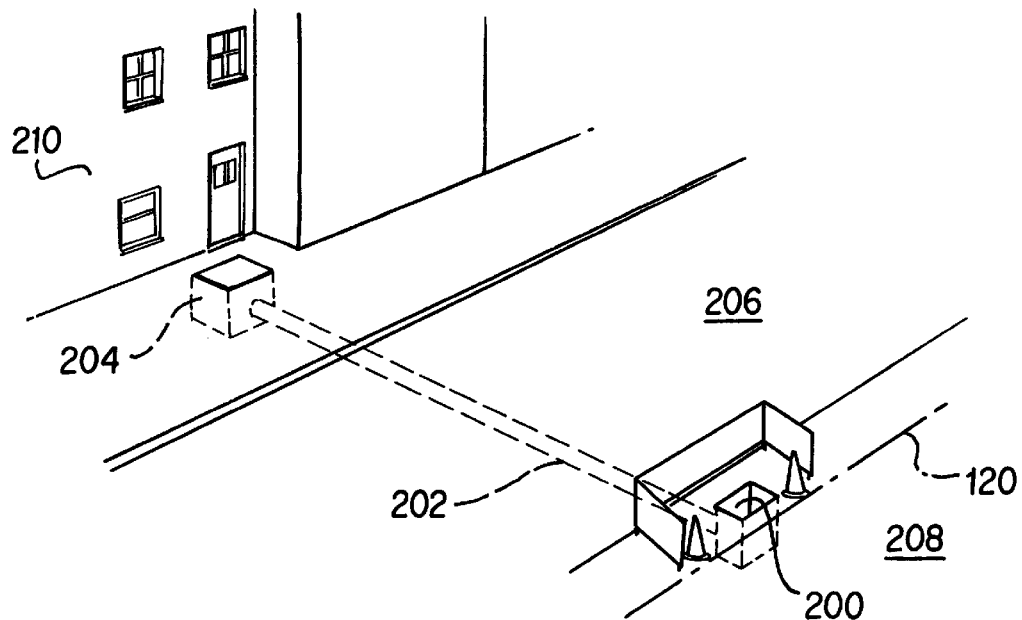
FIG. 1 is a schematic, perspective view of the general operating conditions.

FIG. 1 shows schematically a site comprising a small access pit 200 dug in the ground far enough to clear a section of a conduit, indicated schematically by the line 120, (such as a gas pipe to which a secondary connection is to be made). The pit 200 is connected to a drilled underground passage 202 which opens into a second pit 204 at the other side of the road 206. As can be seen in this drawing, the small dimensions of the access pit 200 restrict the size of the site which does not encroach onto the road 206 and occupies only a small area of the pavement 208 situated on the opposite side of the road to the pavement in which the second pit 204 has been formed. The horizontal section of the first pit 200 is preferably smaller than that normally provided for operations of the same type in which the personnel concerned have to go down into the access pit in order to work therein (a hole of less than 1 m2, for example, 40 cm×70 cm for 1 m of depth would appear to be suitable). The pit 204 is advantageously of a comparable section and depth to the pit 200.

Figure 2:
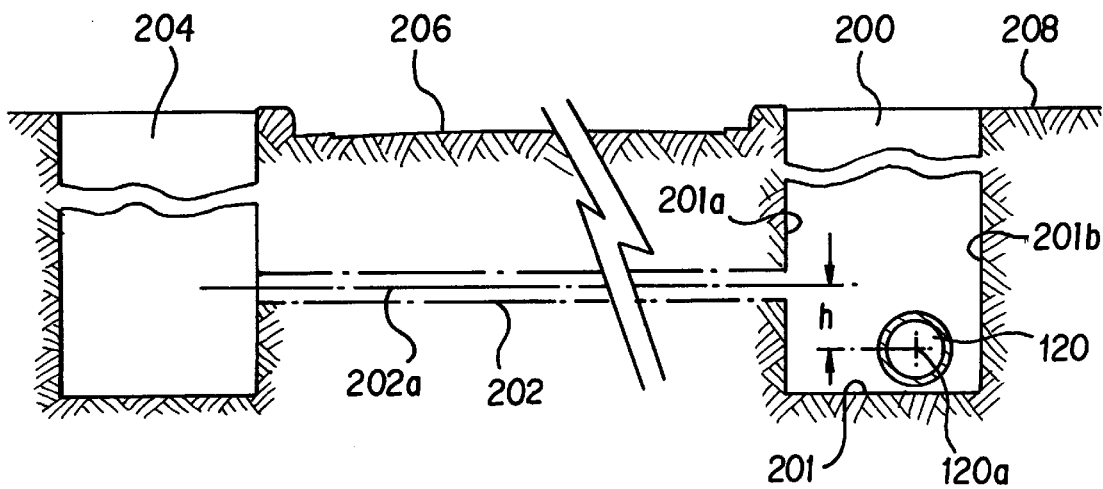
FIG. 2 is an enlarged, sectioned view of the underground operating conditions.

FIG. 2 is an enlarged view, again showing the first pit 200 separated from the pit 204 by the road 206.

The pit 200 has been dug substantially vertically above the conduit 120 (called the main conduit) to which the secondary distribution conduit, for example, leading to the building 210 of FIG. 1 disposed adjacent the second pit 204 is to be connected.

In FIG. 2, the line and the, a priori, horizontal drilling axis of the bore-hole through which the secondary conduit to be connected can be laid without the need to dig a trench across the road 206, are indicated 202, 202a, respectively.

Typically, the axis 202a is transverse and, in the embodiment in question, perpendicular to the axis 120a of the section of the main conduit 120.

It should be noted that the pit 200 has been dug in a manner such as to clear the main conduit 120 and thus extends beneath this conduit which is nevertheless disposed close to the bottom 201 of the pit 200 whilst being closer to the vertical rear wall 201b than to the vertical front wall 201a in which the drilling of the hole 202 is to be performed perpendicular to the axis 120a.

It will also be noted that the height difference (h) separating the perpendicular horizontal axes 120 and 202a is preferably substantially equal to the height of the connection to be disposed between the main and secondary conduits to be connected in the pit 200, that is, typically from a few centimeters to a few tens of centimeters (for example, of the height of a gas branch connector).

FIGS. 3a, 3b, 4a, 4b and 5 show the drilling of the hole 202 by an installation 1.

The installation 1 comprises the actual drilling device 10 which is disposed in a drilling structure or tower 11.

The "drilling tower" 11, formed of metal sections, is preferably in two telescopic parts movable vertically relative to one another.

Although it is possible to drill from the pit 204 towards the conduit 120, in this case the movable portion of the drilling tower 11 is lowered into the pit 200, for example, with the aid of a hand winch, not shown in the drawings and, for this purpose, may be guided vertically, for example, in an auxiliary frame disposed above the pit with the aid of guide rollers, slides, etc.

Figure 3A:
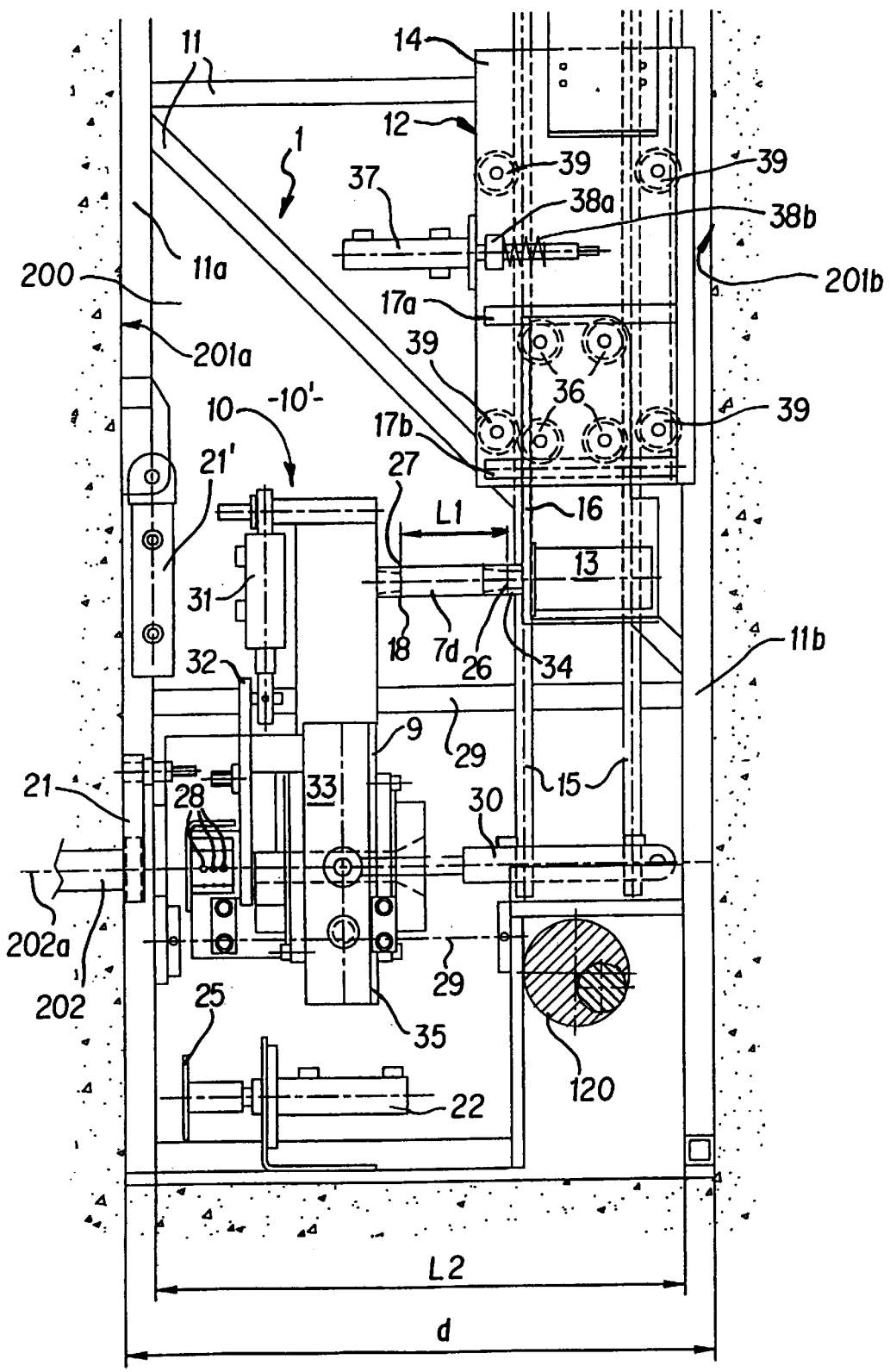
FIGS. 3a and 3b show, in schematic side views, the lower portion and the upper portion, respectively, of a drilling installation usable in the invention.

The horizontal drilling axis 202a and the drill hole 202 formed in the left-hand side wall 201a can be seen in the lower portion of FIG. 3a.

The drilling tower or structure 11 of the pit includes, in the region of the main section 120, downwardly-open recesses formed in these side walls to allow it to be lowered with its lower edge below the section 120 (two possible conduit diameters have been shown in FIG. 3a).

The main elements of the device according to the invention are all arranged close to or in the drilling tower 11, that is:

the drilling drive mechanism 9 which pushes the train of rods forwards, towards the left, in the direction of the drilling axis 202a, or which withdraws this train during the extraction of the train of rods from the drilled hole 202, the rod loader/extractor 12 which enables the length of the train of rods 6 disposed in the hole 202 to be adapted element by element, by the addition or removal of additional rod elements 7 at its rear end, the rod feed magazine 19 in which the rods 7 to be connected to the train of rods 6 are housed, as well as the inclined chute 24 into which the rods withdrawn from the train of rods fall in order to be cleaned therein by the operators, to be checked for damage and to be regressed for further use.

Figure 5:
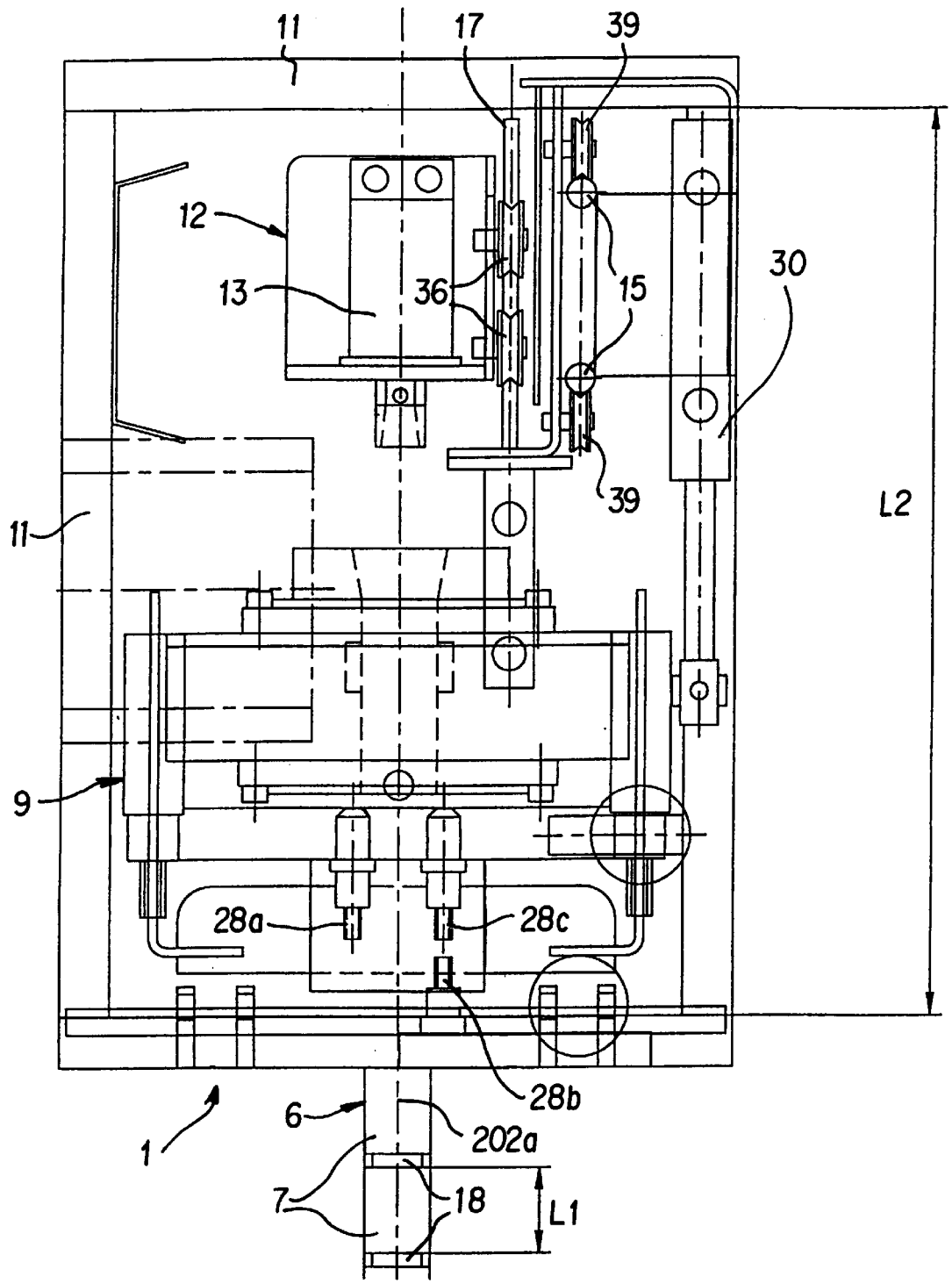
FIG. 5 is a view of the drilling installation from above.

To facilitate understanding of the drawings, FIGS. 3a, 3b and 4a, 4b do not include a train of rods on the drilling axis 202a, in contrast to FIG. 5 in which it can be seen that the train of rods 6 is constituted by elemental rods 7 disposed one behind another and screwed together at their ends.

Each rod element 7 has an axial length L1 (FIGS. 3a and 5) quite clearly shorter than the distance d separating the front wall 201a and the rear wall 201b of the pit 200 in which the drilling machine has been installed (FIG. 3a), and shorter than the length L2 (measured parallel to the axis of the rods 7) of the structure 11 (or at least of its portion which goes down into the pit) between its vertical front and rear lateral members, indicated 11a, 11b in FIG. 3a.

In FIG. 3a, one 7d of these rods is screwed into the threaded sleeve 34 of the motor 13 belonging to the loader/extractor device.

Each threaded rod 7 comprises an annular groove 18 on its periphery.

As can be seen in FIG. 3a, the loader/extractor 12 moves essentially vertically. The drilling rod 7d thus moves in an essentially vertical transportation gap 10'. The drilling drive mechanism 9 can slide on the drilling axis 202a, along guides 29, with the aid of hydraulic pistons 30.

In order to press the train of rods and hence to push the bore-hole forwards, the mechanism 9 for driving the drilling train grasps the rearmost rod 7 (that is, the rod which is still in the region of the drilling tower 11) and the entire drilling drive mechanism 9 is moved towards the left, passing through the position shown in FIG. 3a. The drilling drive mechanism 9 thus moves to and fro between the front wall 201a and the vicinity of the opposite rear wall 201b.

The device 9 may, in addition to this axial movement along the drilling axis 202a, also rotate the train of rods, either during the linear movement or separately. For this purpose, a rotating jaw 33 suitable for gripping the train of rods can rotate or pivot relative to its casing 35 coaxially with the drilling axis 202a. This serves to adjust the orientation in cooperation with a chamfer in an asymmetric arrangement against the tip of the train of rods.

The drilling drive mechanism comprises another jaw 32 called the <<separation>> jaw, which is disposed in front of the rotating jaw 33 and which can keep the train of rods fixed for rotation relative to the casing 35 of the drilling drive mechanism.

An additional clamping jaw 21 is also fixed to the drilling tower 11 in the immediate vicinity of the bore-hole 202 relative to the train of rods 6. This clamping jaw 21 is also constituted, as can best be seen in FIG. 4a, by two jaws directed transversely towards the train of rods. These jaws are driven by a hydraulic jack 21' which is held in a fixed position relative to the drilling tower 11 by one of its ends.

At the lower end of the tower, again below the drilling drive mechanism 9, clamping cylinders 22a, 22b extending in the direction of the drilling axis 202a are arranged in a stationary manner close to the drilling tower 11. The cylinders comprise respective pressure plates 25 at the level of the free ends of their piston rods. Since the drilling tower 11 comprises no external covering in this region, the extension of the piston rods of these clamping cylinders 22 (which, if necessary, are driven by a hydraulic device) presses their pressure plates 25 against the walls of the starting pit 200 and hence the drilling tower 11 against the same walls of the pit 200. The entire drilling tower 11 is thus fixed in the starting pit 200 which is important for the alignment, relative to the drilling hole 202 started, of the drilling axis 202a defined relative to the drilling tower 11 by the drilling drive mechanism 9.

The loader/extractor 12 is constituted, essentially, by the motor 13 with its threaded sleeve 24 which is preferably disposed directly on the output shaft of the motor. This sleeve has a thread suitable for being screwed onto the rear thread of the rods 7 so as to enable them to be assembled with one another. As can be seen in FIG. 3a, this is therefore preferably an external thread applied along a conical surface on the drilling rod 7, in which case, a circular thread pattern is preferably used. The threaded sleeve 34 consequently has an internal thread in the opposite sense and the motor 13 is oriented with its axis of rotation parallel to the axis 202a. The motor 13 can thus move both in the direction of the drilling axis 202a and perpendicular to this direction (vertically along the frame 11).

For this purpose, the motor 13 is fixed to a motor frame 16. The frame 16 can move along the drilling axis 202a, with the aid of wheels 36 comprising respective peripheral annular grooves, along two bars, preferably spaced apart vertically, serving as guides 17 for the motor frame. These guides 17 are fixed on a carriage 14 which, preferably with the aid of wheels 39, can move vertically along carriage guides 15 in the form of bars spaced a certain distance apart in the direction of the drilling axis 202a in the drilling tower 11, in the vicinity of the side 201b.

Figure 3B:
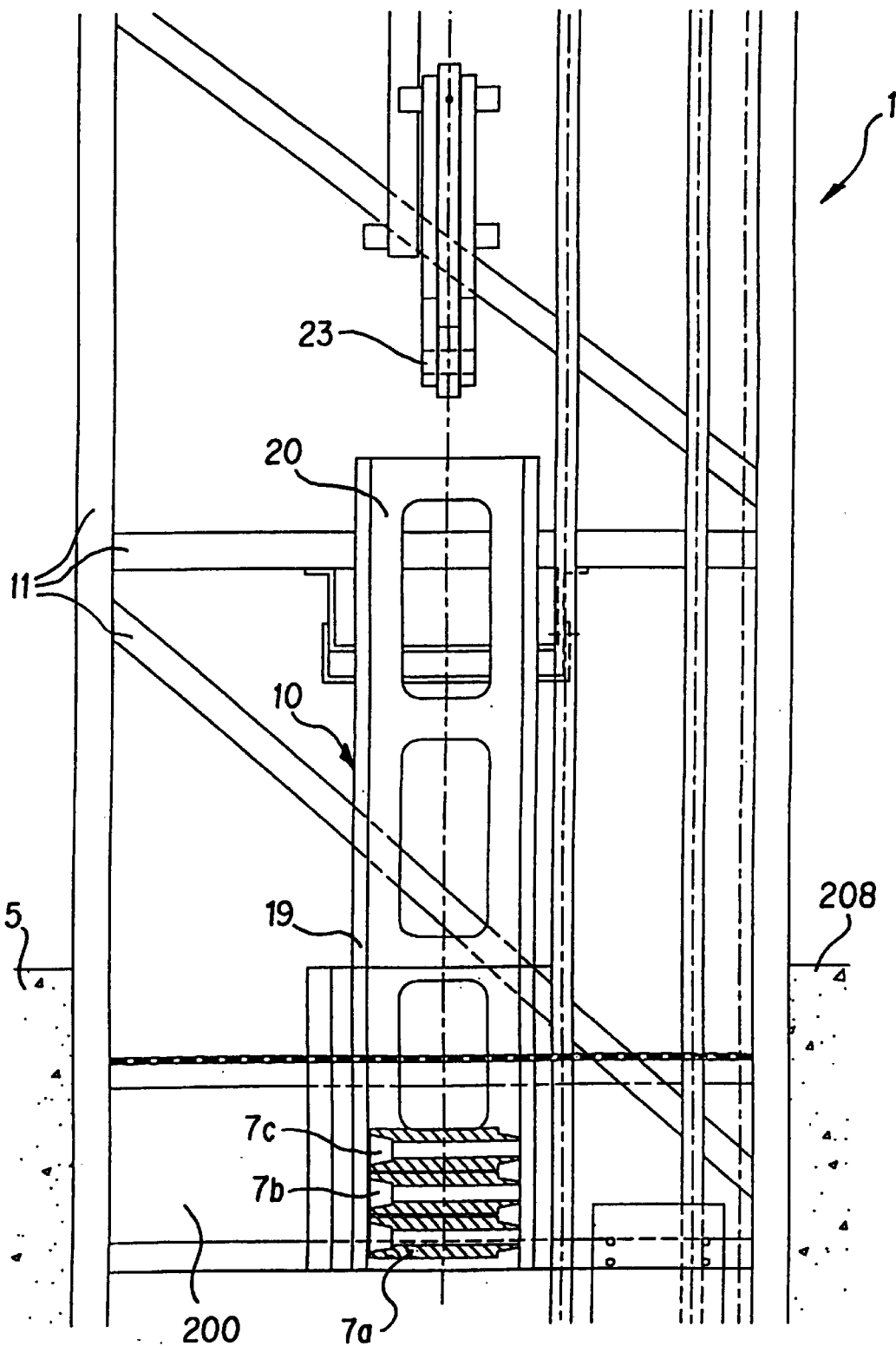
Figure 4A:
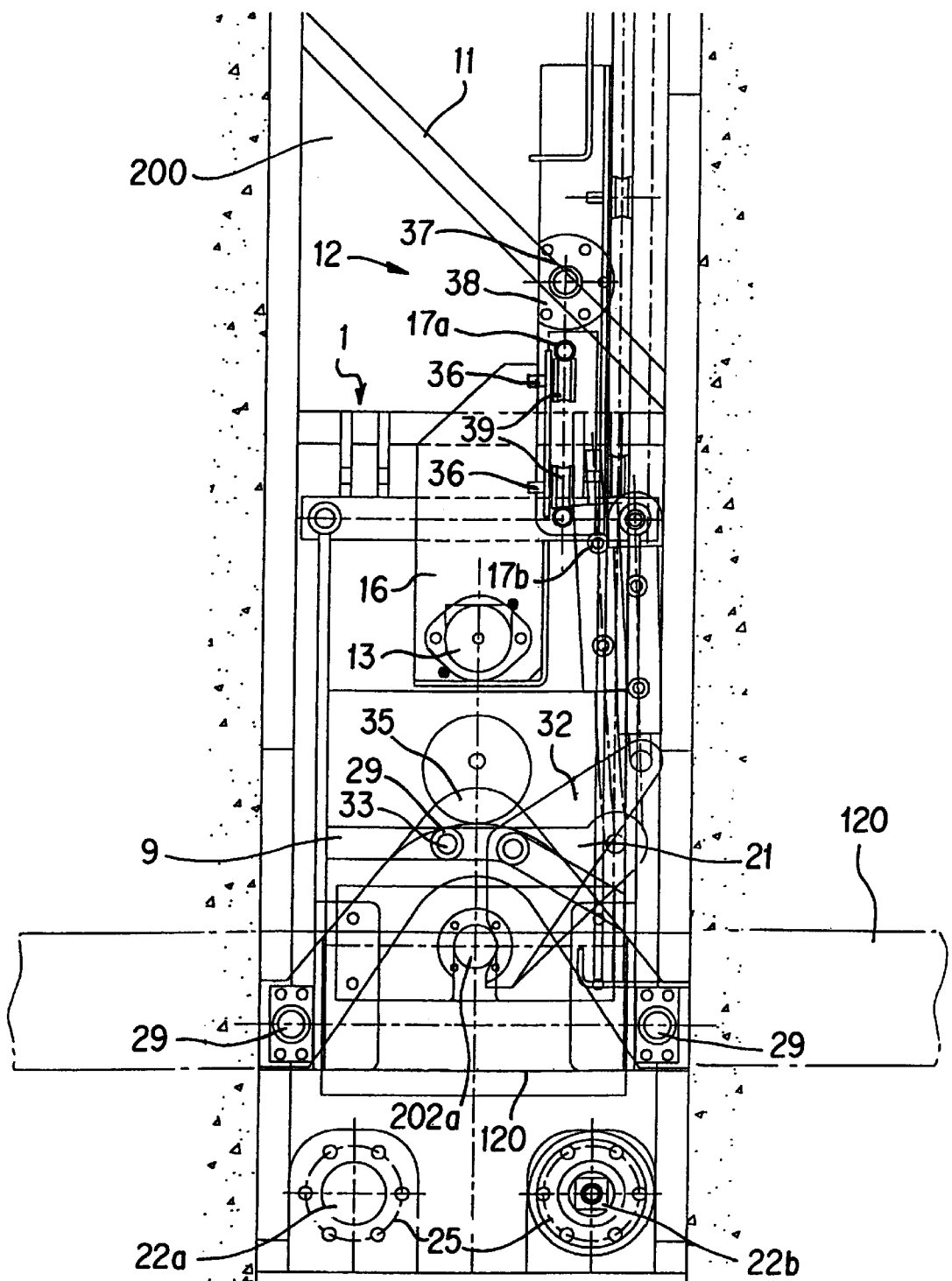
FIGS. 4a and 4b show the same portions as FIGS. 3a and 3b in a front view (relative to the drilling axis)
Figure 4B:
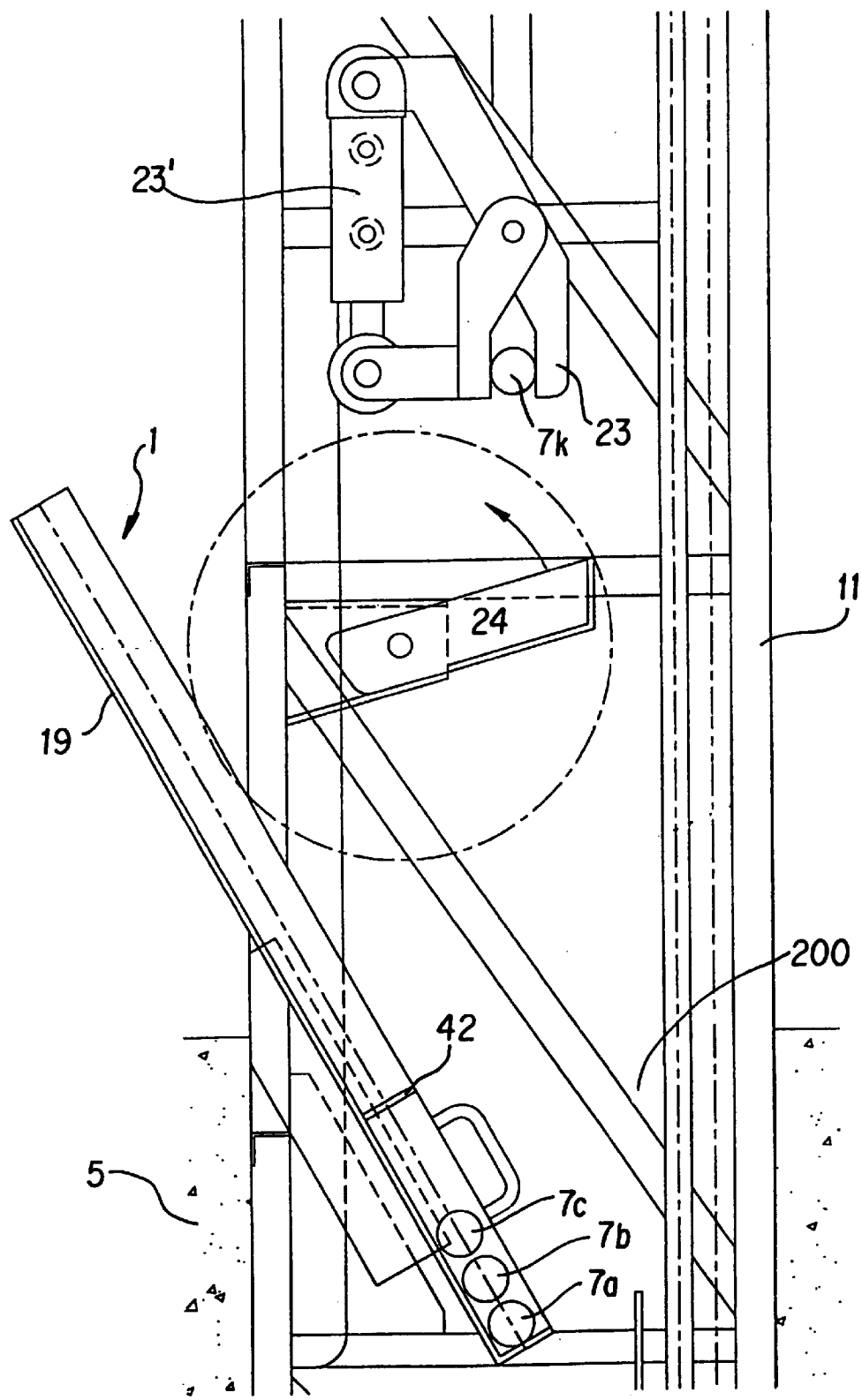

The motor 13 can be moved vertically with the aid of the loader/extractor lifting carriage 14 so as to be aligned either with the drilling axis 202a, in its lowest position, or, in its highest position (FIG. 4b) with a gripper device 23 disposed in the upper region of the drilling tower 11. This gripper device is operated with the aid of a hydraulic jack 23', preferably a double-acting jack. Between these two end positions (which are preferably both situated below the level of the surface 5 of the pavement 208 or, as shown in FIG. 3b, the upper one of which may be above the level of the surface 5 of the pavement 208), on the path of the motor 13, is the position for withdrawal from the feed magazine 19 where "new" drilling rods 7a, 7b, 7c are ready. This feed magazine is constituted essentially by a profiled case 20 disposed in an oblique position, the inclination going up to a vertical position at the maximum. The drilling rods 7 are placed therein from the top.

At its lower end, the case 20 comprises an abutment for the lowest drilling rod 7a and is open on the rear side of this rod which faces towards the motor 13.

The feed magazine 19 thus preferably extends above the ground level 5 and extends outwardly or laterally relative to the drilling tower 11 so that operators can fill it with drilling rods 7 more easily.

When the motor 13 is aligned with the drilling rod 7a housed in the withdrawal position of the feed magazine 19, the motor 13 can be screwed onto the drilling rod 7a by a longitudinal movement along its axis of rotation, accompanied by a rotation of the threaded sleeve 34. Rotation of the drilling rod 7a is prevented by the weight of the drilling rods disposed above and possibly by the weight of a mass 42 also disposed in the feed magazine 19. The descent of the motor 13 with the drilling rod 7a towards the drive device 9 transfers this rod to the train of rods 6 for connection.

The oblique chute 24 is arranged above the lower end of the feed magazine 19 on the vertical path of the drilling rods thus transported and below the gripper device 23, in a manner such that its upper end is still below the gripper device 23. A drilling rod 7 pulled up in the gripper device 23 with the aid of the loader/extractor 12 thus moves aside the oblique chute 24 which can be tilted outwardly about a pivot axis from this path. The oblique chute 24 then returns, owing to the force of gravity, tilting to the operative position shown in FIG. 4b. In this operative position, the drilling rods 7k, which first of all are held by the gripper device 23, fall into the oblique chute 24 after they have been released, and roll along coming out of the drilling tower 11 at the side where they are received by operators for checking and storage.

The operation of this drilling device will now be described.

The description starts with a bore-hole which has already been started and is to be continued.

First of all, the carriage 14 of the loader/extractor device 12 is moved to the upper position with its motor 13 which is then in a rear position close to the rear wall 201b.

When the threaded sleeve 34 carried by the frame 16 comes into alignment with the threads of a rod element 7a which is the lowest of the pile held in the feed magazine 19, it is advanced towards the rod by the piston 37 whilst being rotated by the motor 13 until it has been screwed onto the rod 7a.

The two springs 38a, 38b ensure any necessary compensation for the forward and rearward movement of the piston.

The carriage 14 then descends again along the guides 15 with the rod which has been picked up screwed into the sleeve 34 (see FIG. 3a, rod 7d in the transportation position).

When it has reached the axis of the bore-hole, the carrying frame 16 is advanced again towards the front wall 201a of the starting pit 200 and the front end of the rod element picked up is placed in contact with the last rod element of the train of rods 6 already in place (see FIG. 5).

The rod element picked up is then screwed to this last rear element of the train of rods by rotation of the motor 13. During the screwing, the jaws 33 grip this last element of the train of rods.

The jaws 33 are then released and the drive mechanism 9 is moved rearwardly towards the rear wall 201b until the jaws 33 surround and clamp the rod picked up which has just been connected to the rear of the train 6. The sleeve 34 can thus be unscrewed from this rod.

During the aforementioned release of the jaws 33 and the rearward translation of the mechanism 9, the jaws 21 grip the train 6 to prevent it from moving and, in particular, from moving rearwardly.

The jaws 21 are then released and the train of rods thus lengthened along the axis of the hole is advanced axially in this hole by the pistons 30 (the jaws 33 are still clamped in order to cause the train to rotate slightly, in the event of misalignment, during its advance).

During this time, the loader/extractor device 12 is raised again towards the feed magazine 19.

It should be noted that the presence of the sensors 28a, 28b, 28c disposed close to the drilling drive mechanism 9 and preferably close to its casing 35 enable the position of this mechanism 9 and of the train of rods 6 in relation to the drilling axis 202a to be monitored. In particular, if the annular groove 18 leaves the region of the sensor 28a, the latter emits an error signal warning of a malfunction.

Once the hole 202 has been drilled, the train of rods 6 of which the front, head end has then entered the second pit 204 is withdrawn by progressive retraction of the rod elements 7 in the opposite direction to the above-described supply operations.

During the withdrawal of the train of rods by progressive retraction of the elements making it up, the secondary conduit 210 (see FIG. 6) is simultaneously inserted in the hole 202 drilled by being fixed to the front end of the train of rods 6, in conventional manner.

To avoid damaging the secondary conduit 210 (such as a relatively flexible plastics conduit, for example, made of polyethylene) during this operation, conventional protection means may be provided.

Figure 6:
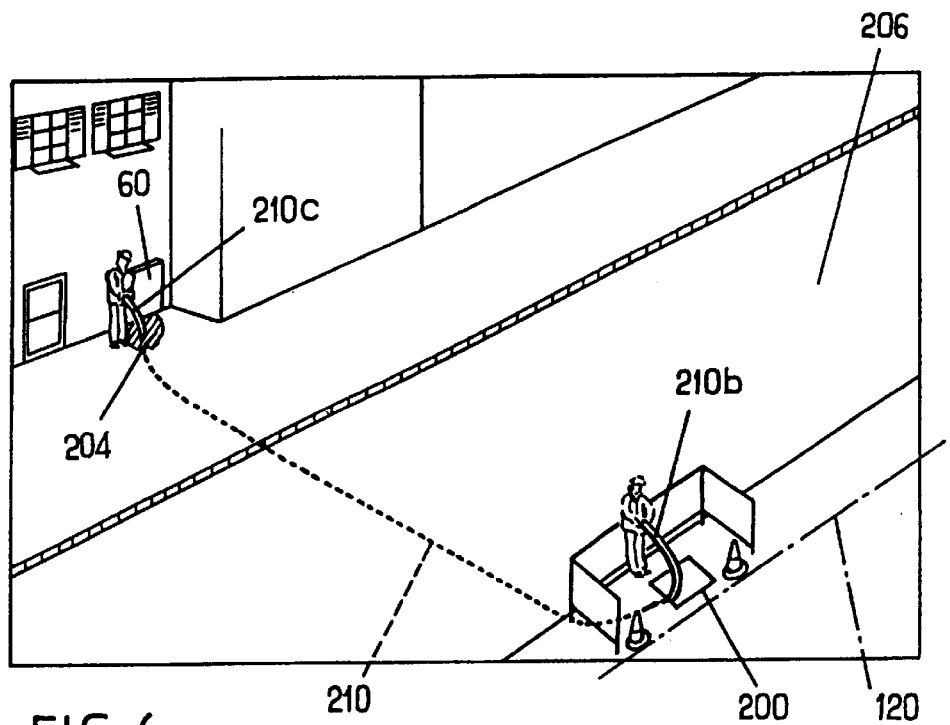
FIG. 6 is a step in the operation, subsequent to that of FIGS. 1 and 2.

After it has passed through the entire length of the hole 202, the <<proximal>> end 210b of the secondary conduit 210 is retrieved by an operator at the top of the pit 200, as shown in FIG. 6 in which, for clarity, the drilling installation, of which no further use is to be made, has already been withdrawn from this hole.

Moreover, the second end 210c of the same conduit 210 emerges through the upper opening of the pit 204 in the vicinity of a sealable connection unit 60 which is also on the surface and which may be constituted by a distribution box connected to a user.

Figure 7:
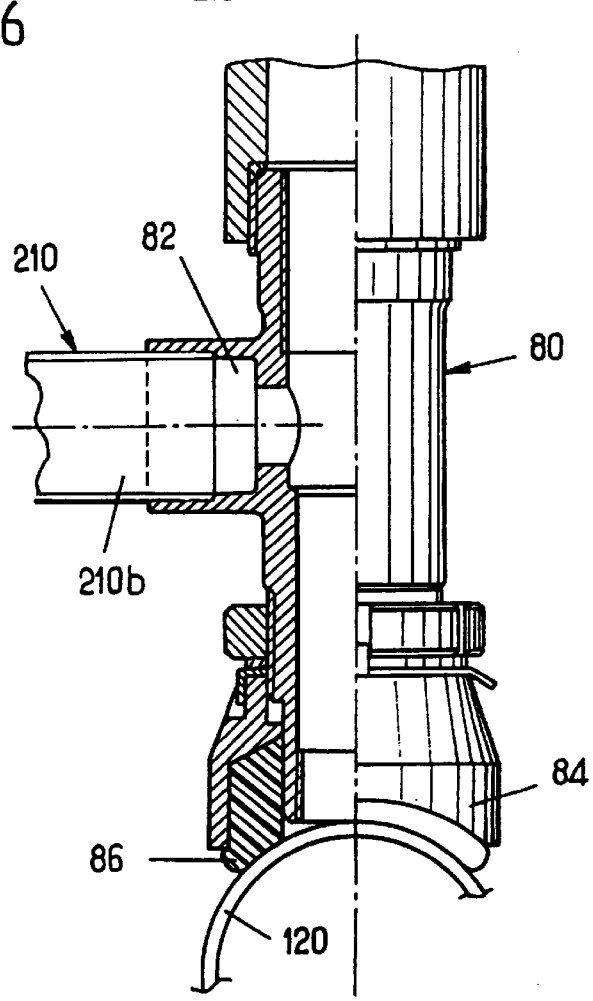
FIG. 7 shows, half in section and half in an external view, a branch connector usable for connecting the main conduit to the secondary conduit.

At this stage of the method, a SEIG (registered trade mark) branch connector 80 such as that shown in FIG. 7 (a more complete description of which is given in FR-A-2 738 617 and/or in FR-A-2 738 614) is connected by a conventional technique (welding, screwing . . . ) to the first end 210b of the branch conduit 210 by its lateral connection region 82.

This operation is thus carried out (a priori) on the surface.

FIG. 8 shows an embodiment of a structure 100 comprising a first vertical support frame 110 comprising two parallel upright members 110 connected by ties. The frame has guide slides 112a, 113a fixed to the upright members. These slides allow the tools serving for the connection of the branch conduit 210 to the main conduit 120 to be slid along the upright members towards the bottom of the pit in question (not shown in the drawing).

Telescopic feet are fixed to the upper portion of the frame 110 on each of the upright members to enable the structure to be stabilized relative to the ground when the structure is positioned in the pit.

On the lower portion of the frame 110, arms such as 120a, which slide relative to the upright members and are adjustable vertically in position in order to be adapted to the different diameters of the pipes to be clamped, terminate at their lower ends in first, inverted "V"s such as 124a for resting on the conduit.

The structure 100 also comprises, in the lower portion of the frame, a support device 130 comprising a shoe 134 having two portions in the form of second "V"s such as 136a which are intended to face the first "V"s in order to form a precise and reliable connection with the conduit positioned between them.

Before the steps of the actual connection of the main conduit 120 and the branch conduit 210 are carried out, it is necessary to clean the main conduit at the level of the region of the fixing of the branch connector 80.

In particular, when the main conduit is made of metal, it is generally covered by a layer of protective resin which has to be removed in order to be able to position the branch connector 80 on the main conduit in a satisfactory manner.

A first, cleaning tool is used for carrying out this step of cleaning the main pipe 120 and is lowered into the pit 200 and then raised again with the use of the structure 100. For a description of this tool, reference should be made to the description of FR-A-2 738 617 and FR-A-2 738 614.

When the main conduit 120 has been cleaned, the first cleaning tool is withdrawn from the pit 200. The end of the branch conduit 210 which is connected to the branch connector 80 is then lowered into the pit 200 by means of a second, positioning and fixing tool 140, shown in FIG. 9. To ensure suitable positioning of the connector 80 on the main conduit 120 in the location of its second semi-cylindrical (saddle-shaped) connection region 84, a pull is exerted at the same time on the second end 210c of the branch conduit 210 emerging through the opening of the pit 204 in order to take up the corresponding "excess length" (FIG. 6).

The second, positioning and fixing tool 140 shown in FIG. 9 comprises a hollow shaft 142 having an internal cavity 143 throughout its length. The lower portion of this cavity comprises means for temporarily holding the connector, the means being constituted, in this case, by an internal thread 144 for receiving a thread of the upper portion of the branch connector 80.

The upper portion of the connector 80 is thus fixed removably to this second positioning and fixing tool, for example, by screwing. With the connector 80 in contact with the conduit 120 by its saddle 84, the shaft 12 is rotated relative to the fixing assembly 146 which gives rise to an axial movement of the said shaft relative to the structure. A force is thus exerted between a leakproof seal 8 housed in the branch connector 80 (FIG. 7) and the conduit 120, in which fluid may be circulating (if it is provided for the transportation thereof).

Whilst the force is applied between the connector 80 and the conduit 120, a lock chamber (not shown) is positioned by screwing on the upper threaded end of the shaft 142. This lock chamber permits operation with a fluid load once communication has been established between the branch conduit 210 and the main conduit 120.

This lock-chamber system may, for example, be taken from a PIEDFORT (registered trade mark) machine model M80.

After the leaktightness of the positioning has been checked, the main conduit 120 is put into communication with the branch conduit 210.

The conduit 210 may also be cut to length on the opposite side; it is then connected in a leaktight manner to the connecting unit 60.

When the lock chamber has been put in place, a third tool (not shown) for piercing the main conduit 120 is introduced through the internal cavity 143 of the second tool 140.

When the conduit has been pierced, the third tool is withdrawn and the final fixing of the connector 80 to the main conduit is carried out. For this purpose, a fourth fixing tool (not shown) is introduced in a leaktight but freely slidable manner through the internal cavity of the second tool 140.

Once the connector 80 has been fixed, the fourth tool is withdrawn before leaktightness between the conduits 120 and 210 is checked again.

The second positioning and fixing tool 140 and then the structure 100 can then be withdrawn from the access pit.

For all of the foregoing description relating to the laying of the secondary conduit 210 and its connection to the main section of conduit 120 situated in the pit 200, reference may be made, if necessary, to FR-A-2 738 617 and/or FR-A-2 738 614.

Before the access pit 200 is closed, there may remain a last step in which the equivalent of the layer of protective resin removed by brushing at the start of the operation is formed.

A fifth tool, the description and use of which are provided in FR-A-2 738 614 and FR-A-2 738 615 may be used for this purpose.

After these last operating devices have been withdrawn form the pits 200, 204, or from their immediate surroundings, it remains only to fill the pits in again, the secondary conduit 210 having been correctly connected without the need to form a trench across the road 206.

We claim:

1. A method of connecting a section of buried main conduit, said buried main conduit being buried in the ground, to a secondary conduit, comprising the steps of:

digging a starting pit and a finishing pit, the starting pit having a certain length and being dug to a depth at least until a section of said buried main conduit is cleared, and the finishing pit being dug to at least the same depth as the starting pit;

providing a drilling device including a plurality of drilling rod elements to be arranged end to end along an axis thereby constituting a train of drilling rods having a common axis and suitable for being pushed forward through the ground in a drilling direction to create a borehole between said pits;

lowering said device into the starting pit, said drilling rod elements being selected to have individual axial lengths shorter than the length of said starting pit in the direction of drilling;

positioning the axis of said drilling rod train so as to drill said borehole substantially horizontally and transverse to said main conduit, at a position a predetermined distance from said main conduit;

laterally gripping said drilling rod train with laterally disposed gripping means;

simultaneously pushing and rotating said gripping means, thereby pushing and rotating said drilling rod train substantially along said axis formed connecting said starting and finishing pits;

passing said secondary conduit through said borehole such that one end of said secondary conduit is positioned above the starting pit in which said main conduit section is exposed;

fixing to said one end of said secondary conduit a first section of a branch connector;

lowering said branch connector into said starting pit;

fixing a second section of said branch connector to said main conduit in said starting pit; and closing up said pits.

2. A method according to claim 1, wherein starting pit is formed substantially vertically above the section of main conduit and drilling is carried out with the said drilling device from this pit towards the finishing pit.

3. The method according to claim 1, further comprising the steps of:

providing an annular groove on each of said drilling rod elements;

providing at least one sensor adapted to monitor an axial position of said drilling rod train by detecting an axial position of the annular groove of one of said drilling rod elements relative to said at least one sensor.

4. The method according to claim 1, wherein the step of pushing said drilling rod train comprises the steps of:

coupling an additional drilling rod element to a rear end of said drilling rod train located in said borehole;

providing additional gripping means for gripping said drilling rod train at a predetermined distance from said borehole;

releasing said laterally disposed gripping means;

displacing said laterally disposed gripping means so as to grip said additional drilling rod element;

releasing said additional gripping means; and pushing said additional rod element coupled to said drilling rod train into said borehole with said laterally disposed gripping means.

5. The method according to claim 1, further comprising the step of sequentially lowering each of said drilling rod elements into said one pit using a loader and extractor device including a motor provided with a threaded sleeve adapted to be screwed onto a rear end thread of each rod element to be lowered.

6. A method of connecting a section of buried main conduit, said buried main conduit being buried in the ground, to a secondary conduit, comprising the steps of:

digging a starting pit and a finishing pit, the starting pit having a certain length and being dug to a depth at least until a section of said buried main conduit is cleared, and the finishing pit being dug to at least the same depth as the starting pit;

providing a drilling device including a plurality of drilling rod elements to be arranged end to end along an axis thereby constituting a train of drilling rods having a common axis and suitable for being pushed forward through the ground in a drilling direction to create a borehole between said pits;

lowering said device into the starting pit, said drilling rod elements being selected to have individual axial lengths shorter than the length of said starting pit in the direction of drilling;

positioning the axis of said drilling rod train so as to drill said borehole substantially horizontally and transverse to said main conduit, at a position a predetermined distance from said main conduit;

laterally gripping said drilling rod train with laterally disposed gripping means;

pushing and rotating said gripping means, thereby pushing and rotating said drilling rod train substantially along said axis, until a borehole is formed connecting said starting and finishing pits;

passing said secondary conduit through said borehole such that one end of said secondary conduit is positioned above the starting pit in which said main conduit section is exposed;

fixing to said one end of said secondary conduit a first section of a branch connector;

lowering said branch connector into said starting pit;

fixing a second section of said branch connector to said main conduit in said starting pit; and closing up said pits.

* * * * *

UNITED STATES PATENT AND TRADEMARK OFFICE
CERTIFICATE OF CORRECTION

PATENT NO. : 6,068,426

DATED : May 30, 2000

INVENTOR(S) : Francois Blanquet et al.

It is certified that error appears in the above-identified patent and that said Letters Patent are hereby corrected as shown below:

COLUMN 10, LINE 15,

"seal 8" should be --seal 86--.

COLUMN 11, LINE 25 (CLAIM 1), after "axis" insert --, until a borehole is--.

Signed and Sealed this

Fifteenth Day of May, 2001

*Attest:*

NICHOLAS P. GODICI

*Attesting Officer*  *Acting Director of the United States Patent and Trademark Office*